(12) United States Patent
Jalal et al.

(10) Patent No.: US 8,490,107 B2
(45) Date of Patent: Jul. 16, 2013

(54) PROCESSING RESOURCE ALLOCATION WITHIN AN INTEGRATED CIRCUIT SUPPORTING TRANSACTION REQUESTS OF DIFFERENT PRIORITY LEVELS

(75) Inventors: Jamshed Jalal, Austin, TX (US); Mark David Werkheiser, Austin, TX (US); Brett Stanley Feero, Austin, TX (US); Michael Alan Filippo, Driftwood, TX (US); Ramamoorthy Guru Prasadh, Austin, TX (US); Phanindra Kumar Mannava, Austin, TX (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/137,362

(22) Filed: Aug. 8, 2011

(65) Prior Publication Data

US 2013/0042249 A1  Feb. 14, 2013

(51) Int. Cl.
*G06F 9/46* (2006.01)
*G06F 15/16* (2006.01)
*G06F 15/173* (2006.01)

(52) U.S. Cl.
USPC ........... 718/104; 718/105; 709/201; 709/227; 709/230; 709/238

(58) Field of Classification Search
None
See application file for complete search history.

(56) References Cited

U.S. PATENT DOCUMENTS

| | | | |
|---|---|---|---|
| 4,295,122 A | 10/1981 | Hatada et al. |
| 4,412,285 A | 10/1983 | Neches et al. |
| 4,499,538 A | 2/1985 | Finger et al. |
| 4,558,429 A | 12/1985 | Barlow et al. |
| 4,604,685 A | 8/1986 | Brown et al. |
| 4,752,872 A | 6/1988 | Ballatore et al. |
| 4,755,938 A | 7/1988 | Takahashi et al. |
| 4,819,229 A | 4/1989 | Pritty et al. |
| 5,053,946 A | 10/1991 | Jain |

(Continued)

FOREIGN PATENT DOCUMENTS

| CN | 101471863 | 7/2009 |
| CN | 101505252 | 8/2009 |

(Continued)

OTHER PUBLICATIONS

H. Liu et al, "A Multi-Class Routing Algorithm Based on QoS Fluctuation Function" IEEE 2004, pp. 512-515.

(Continued)

*Primary Examiner* — Emerson Puente
*Assistant Examiner* — Adam Lee
(74) *Attorney, Agent, or Firm* — Nixon & Vanderhye P.C.

(57) ABSTRACT

An integrated circuit 2 includes a plurality of transaction sources 6, 8, 10, 12, 14, 16, 18, 20 communicating via a ring-based interconnect 30 with shared caches 22, 24 each having an associated POC/POS 30, 34 and serving as a request servicing circuit. The request servicing circuits have a set of processing resources 36 that may be allocated to different transactions. These processing resources may be allocated either dynamically or statically. Static allocation can be made in dependence upon a selection algorithm. This selection algorithm may use a quality of service value/priority level as one of its input variables. A starvation ratio may also be defined such that lower priority levels are forced to be selected if they are starved of allocation for too long. A programmable mapping may be made between quality of service values and priority levels. The maximum number of processing resources allocated to each priority level may also be programmed.

22 Claims, 8 Drawing Sheets

U.S. PATENT DOCUMENTS

| | | | |
|---|---|---|---|
| 5,193,195 | A | 3/1993 | Miyazaki |
| 5,247,671 | A | 9/1993 | Adkins et al. |
| 5,283,904 | A | 2/1994 | Carson et al. |
| 5,375,223 | A | 12/1994 | Meyers et al. |
| 5,390,329 | A | 2/1995 | Gaertner et al. |
| 5,535,340 | A | 7/1996 | Bell et al. |
| 5,546,546 | A | 8/1996 | Bell et al. |
| 5,581,782 | A | 12/1996 | Sarangdhar et al. |
| 5,592,622 | A | 1/1997 | Isfeld et al. |
| 5,634,006 | A | 5/1997 | Baugher et al. |
| 5,649,157 | A | 7/1997 | Williams |
| 5,745,913 | A | 4/1998 | Pattin et al. |
| 5,794,073 | A | 8/1998 | Ramakrishnan et al. |
| 5,796,977 | A | 8/1998 | Sarangdhar et al. |
| 5,860,150 | A | 1/1999 | Chiarot et al. |
| 5,905,876 | A | 5/1999 | Pawlowski et al. |
| 6,260,099 | B1 | 7/2001 | Gilbertson et al. |
| 6,546,017 | B1* | 4/2003 | Khaunte .................. 370/412 |
| 6,591,307 | B1 | 7/2003 | Arimilli et al. |
| 6,745,262 | B1 | 6/2004 | Benhase et al. |
| 6,832,279 | B1 | 12/2004 | Potter et al. |
| 7,206,922 | B1 | 4/2007 | Steiss |
| 7,239,607 | B1 | 7/2007 | Vijeh et al. |
| 7,656,880 | B1* | 2/2010 | Jones .................. 370/395.21 |
| 8,239,536 | B2* | 8/2012 | Wang et al. .................. 709/226 |
| 8,255,915 | B1 | 8/2012 | Blanding et al. |
| 2001/0043610 | A1 | 11/2001 | Nemirovsky et al. |
| 2002/0043610 | A1 | 4/2002 | Lee et al. |
| 2002/0065932 | A1 | 5/2002 | Kobayashi |
| 2002/0082856 | A1* | 6/2002 | Gray et al. .................. 705/1 |
| 2002/0138678 | A1 | 9/2002 | Kim et al. |
| 2002/0141256 | A1 | 10/2002 | Barri et al. |
| 2002/0145924 | A1* | 10/2002 | Beckwith .................. 365/200 |
| 2002/0178263 | A1 | 11/2002 | Hreha et al. |
| 2002/0184423 | A1 | 12/2002 | Khan et al. |
| 2003/0018801 | A1 | 1/2003 | Ganti et al. |
| 2003/0033461 | A1 | 2/2003 | Malik et al. |
| 2003/0084274 | A1 | 5/2003 | Gaither et al. |
| 2003/0120705 | A1 | 6/2003 | Chen et al. |
| 2003/0126342 | A1 | 7/2003 | Shah et al. |
| 2003/0126380 | A1 | 7/2003 | Mastronarde et al. |
| 2003/0188139 | A1 | 10/2003 | Chrysos et al. |
| 2003/0236854 | A1* | 12/2003 | Rom et al. .................. 709/217 |
| 2004/0194097 | A1 | 9/2004 | Spencer |
| 2004/0205752 | A1 | 10/2004 | Chou et al. |
| 2005/0138252 | A1 | 6/2005 | Gwilt |
| 2006/0013230 | A1 | 1/2006 | Bosloy et al. |
| 2006/0056406 | A1 | 3/2006 | Bouchard et al. |
| 2006/0136639 | A1 | 6/2006 | Futral et al. |
| 2006/0248535 | A1 | 11/2006 | Grover |
| 2007/0165668 | A1 | 7/2007 | Liu |
| 2007/0180087 | A1* | 8/2007 | Mizote et al. .................. 709/223 |
| 2007/0271613 | A1 | 11/2007 | Joyce |
| 2008/0040730 | A1 | 2/2008 | Kang et al. |
| 2008/0069115 | A1 | 3/2008 | Jensen |
| 2008/0168446 | A1* | 7/2008 | Shen et al. .................. 718/101 |
| 2008/0235423 | A1 | 9/2008 | Mace |
| 2008/0244587 | A1 | 10/2008 | Li et al. |
| 2008/0244600 | A1* | 10/2008 | Wong et al. .................. 718/104 |
| 2008/0279139 | A1* | 11/2008 | Beziot et al. .................. 370/329 |
| 2009/0055831 | A1* | 2/2009 | Bauman et al. .................. 718/104 |
| 2009/0198957 | A1 | 8/2009 | Arimilli et al. |
| 2009/0217273 | A1 | 8/2009 | Mutlu et al. |
| 2010/0100703 | A1 | 4/2010 | Basu et al. |
| 2010/0169570 | A1 | 7/2010 | Mesnier et al. |
| 2011/0055444 | A1 | 3/2011 | Henriksson et al. |
| 2011/0072178 | A1 | 3/2011 | Mace |
| 2011/0231588 | A1 | 9/2011 | Meredith |
| 2011/0299410 | A1 | 12/2011 | Diab et al. |
| 2012/0036509 | A1 | 2/2012 | Srinivasan et al. |
| 2012/0069034 | A1 | 3/2012 | Biswas et al. |
| 2012/0096468 | A1* | 4/2012 | Chakravorty et al. ........ 718/103 |
| 2012/0159502 | A1* | 6/2012 | Levin et al. .................. 718/104 |

FOREIGN PATENT DOCUMENTS

| | | |
|---|---|---|
| EP | 2 339 795 | 6/2011 |
| FR | 2 669 133 | 5/1992 |
| FR | 2 838 588 | 10/2003 |
| GB | 1 473 581 | 5/1977 |
| GB | 2 216 368 | 10/1989 |
| GB | 2 236 459 | 4/1991 |
| JP | 2008948 | 1/1990 |
| KR | 100604220 | 7/2006 |
| WO | WO 01/48617 | 7/2001 |
| WO | WO 2009/152711 | 12/2009 |
| WO | WO 2012/034455 | 3/2012 |
| WO | WO 2012/054754 | 4/2012 |

OTHER PUBLICATIONS

C. Casetti et al, "QoS-Aware Routing Schemes Based on Hierarchical Load-Balancing for Integrated Services Packet Networks" IEEE 1999, pp. 489-493.

T. Sandholm et al, "MapReduce Optimization Using Regulated Dynamic Prioritization" Sigmetrics/Performance'09, Jun. 2009, 12 pages.

S.V. Bostjancic Rakas et al, "An Efficient QoS Mapping Algorithm in Multi-Provider Networks" IEEE 2011, pp. 74-78.

A.E. Kamal, "Priority mechanism for the DQDB network" IEE Proc.-Commun., vol. 141, No. 2, Apr. 1994, pp. 98-104.

S. Cavalieri, "Meeting Real-Time Constraints in CAN" IEEE Transactions on Industrial Informatics, vol. 1, No. 2, May 2005, pp. 124-135.

K. Cho et al, "Design and Analysis of a Fair Scheduling Algorithm for QoS Guarantees in High-Speed Packet-Switched Networks" IEEE 1998, pp. 1520-1525.

T. Bai et al, "Flexible Fuzzy Priority Scheduling of the CAN Bus" Asian Journal of Control, vol. 7, No. 4, Dec. 2005 pp. 401-413.

UK Search Report dated Sep. 28, 2012 for GB 1210138.2.

Office Action mailed Apr. 3, 2013 in co-pending U.S. Appl. No. 13/137,360.

* cited by examiner

| Programmable Starvation Ratios | Level Winning Allocation | | | |
|---|---|---|---|---|
| Starved Level | | L | M | H | HH |
| L | - | $R_{L:M}$ | $R_{L:H}$ | $R_{L:HH}$ |
| M | - | - | $R_{M:H}$ | $R_{M:HH}$ |
| H | - | - | - | $R_{H:HH}$ |
| HH | - | - | - | - |

FIG. 9

PROCESSING RESOURCE ALLOCATION WITHIN AN INTEGRATED CIRCUIT SUPPORTING TRANSACTION REQUESTS OF DIFFERENT PRIORITY LEVELS

BACKGROUND OF THE INVENTION

1. Field of the Invention

This invention relates to the field of integrated circuits. More particularly, this invention relates to the allocation of resources to the processing of transactions requests that can have different priority levels.

2. Description of the Prior Art

It is known to provide integrated circuits that have a plurality of transaction sources, such as transaction masters, coupled via interconnect circuitry to request servicing circuitry, such as one or more transaction slaves. It is desirable to balance the processing resources allocated to the different priority levels such that no individual priority level is allocated too few or too many of the processing resources.

SUMMARY OF THE INVENTION

Viewed from one aspect the present invention provides an integrated circuit comprising: a plurality of transaction sources configured to generate transaction requests; and request servicing circuitry configured to process said transaction requests using a set of processing resources; wherein said transaction requests each have an associated quality of service value within a range of quality of service values; said request servicing circuitry is configured to map, in accordance with a quality of service mapping configuration, quality of service values within different sub-ranges of said range of quality of service values to different priority levels within a hierarchy of priority levels extending from a lowest level to a highest level; and said request servicing circuitry is configured to provide a maximum number of said processing resources that can be concurrently allocated to service transaction requests within each level of said hierarchy.

The present technique utilizes a quality of service value associated with the transaction requests and maps this to a smaller number of priority levels within a hierarchy of priority levels. Each of these priority levels has a maximum number of the processing resources that can be concurrently allocated to service transaction requests within that level of the hierarchy. A sub-range of quality of service values accordingly maps to a priority level and then the maximum number of resources allocated to each priority level may be controlled.

Improved adaptability of the integrated circuit may be achieved when one or both of the quality of service mapping and/or the maximum number within each level of the hierarchy are programmable.

The maximum number of allocatable resources to each level of the hierarchy will in some embodiments monotonically increase with the hierarchy of priority. Higher priority levels will thus have higher numbers of potentially available processing resources.

The processing resources allocated to transactions requests within a given level of the hierarchy may be tracked such that when one of the processing resources is allocated to a transaction request within a given level then a count value is incremented and when a processing resource ceases to be allocated to a transaction request within that given level then the count value is decremented. These count values can be used to track the balance between processing resources allocated to the different levels within the hierarchy.

The counts may be individually incremented/decremented independent of each other or alternatively if a count value associated with a given priority level is incremented/decremented, then the count values of all lower priority levels are similarly incremented/decremented. This approach helps avoid allocation of processing resources to lower priority levels in preference to higher priority levels.

The request servicing circuitry may be formed to switch between dynamic allocation and static allocation of the processing resources. Static allocation may be performed based upon a selection algorithm. The selection algorithm may in some embodiments be dependent upon a respective priority level associated with each of the transaction requests.

The requests and messages exchanged between the transaction sources and the request servicing circuitry can take a variety of forms. In some embodiments said request servicing circuitry is configured: to receive from a requesting transaction source from among said plurality of transaction sources an at least implicit request to allocate one of said set of processing resources for use by said requesting transaction source in processing a transaction associated with said transaction request; to determine if one of said set of processing resources is available for use by said requesting transaction source; if one of said set of processing resources is available for use by said requesting transaction source, then to allocate said one or said set of processing resources to said requesting transaction source for use in processing said transaction; and if none of said set of processing resources is available for use by said requesting transaction source, then to send a retry response to said requesting transaction source; said requesting transaction source is configured: to receive from said request servicing circuitry said retry response; and to respond to said retry response by waiting for a proceed response to be received from said request servicing circuitry before proceeding with said transaction associated with said transaction request; and said request servicing circuitry is configured: to track those of said plurality of transaction sources awaiting a proceed response; to allocate one of said set of processing resources to one of said transaction sources awaiting a proceed response; and to send a proceed response to said one of said transaction sources awaiting a proceed response.

The selection algorithm used within the static allocation may employ round robin selection among transaction requests awaiting static allocation that share a priority level. This is simple to implement and provides predictable behaviour ensuring no individual transaction request is permanently starved of processing resource allocation.

The selection algorithm used in the static allocation may also select between transaction requests awaiting static allocation that have different priority levels. It is not always the case that the higher priority level transactions will be selected. A starvation ratio may be used to force selection of a lower priority transaction when a number of higher priority transactions greater than a threshold ratio value have been previously selected in preference over that lower priority level transaction. This starvation ratio may be programmable.

The plurality of transaction sources may take a variety of different forms, including a graphics processing unit, an input/output coherent device and a processor cluster. Such a processor cluster may include a plurality of processor cores and a shared local cache memory.

The request servicing circuitry can also take a variety of different forms. In some embodiments the request servicing circuitry is a shared cache memory.

More than one request servicing circuitry may be provided within the integrated circuit. This facilitates scaling of such resources.

Interconnect circuitry may be used to communicate transaction requests between the transaction sources and the request servicing circuitry. Such interconnect circuitry may in some embodiments be ring-based interconnect circuitry.

Viewed from another aspect the present invention provides an integrated circuit comprising: a plurality of transaction source means for generating transaction requests; and request servicing means for processing said transaction requests using a set of processing resource means for processing; wherein said transaction requests each have an associated quality of service value within a range of quality of service values; said request servicing means is configured to map, in accordance with a programmable quality of service mapping configuration, quality of service values within different sub-ranges of said range of quality of service values to different priority levels within a hierarchy of priority levels extending from a lowest level to a highest level; and said request servicing means is configured to provide a maximum number of said processing resource means that can be concurrently allocated to service transaction requests within each level of said hierarchy.

Viewed from a further aspect the present invention provides a method of communicating within an integrated circuit comprising the steps of generating transaction requests using a plurality of transaction sources; and processing said transaction requests using a set of processing resources; wherein said transaction requests each have an associated quality of service value within a range of quality of service values; and further comprising the steps of mapping, in accordance with a programmable quality of service mapping configuration, quality of service values within different sub-ranges of said range of quality of service values to different priority levels within a hierarchy of priority levels extending from a lowest level to a highest level; and providing a maximum number of said processing resource means that can be concurrently allocated to service transaction requests within each level of said hierarchy.

The above, and other objects, features and advantages of this invention will be apparent from the following detailed description of illustrative embodiments which is to be read in connection with the accompanying drawings.

BRIEF DESCRIPTION OF THE DRAWINGS

FIG. 9 is a diagram schematically illustrating programmable starvation ratios between different priority levels.

DESCRIPTION OF THE EMBODIMENTS

Figure 1:
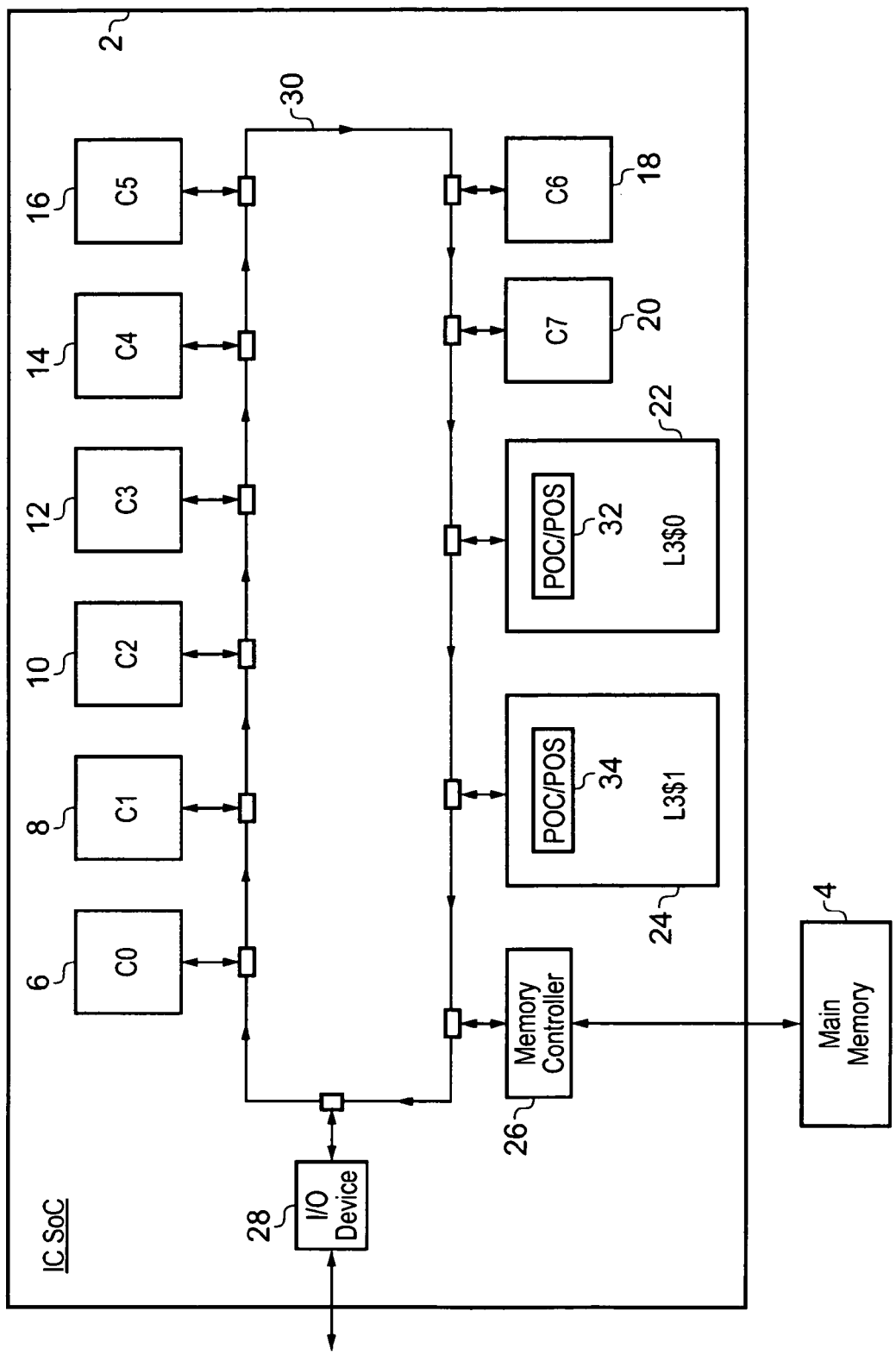
FIG. 1 schematically illustrates an integrated circuit including a plurality of transaction sources connected via a ring-based interconnect to a plurality of request servicing circuitry.

FIG. 1 schematically illustrates an integrated circuit 2 in the form of a system-on-chip integrated circuit connected to a main memory 4. The integrated circuit 2 includes a plurality of transaction sources 6, 8, 10, 12, 14, 16, 18, 20, a plurality of request servicing circuits including shared cache memories 22, 24, a memory controller 26 and an input/output device 28 all communicating via a ring-based interconnect 30. Also considered part of the request servicing circuitry are the points of coherence/points of serialisation (POC/POS) 32, 34 that are part of the shared cache memories 22, 24 which receive and send transactions on the ring-based interconnect 30.

The transaction sources 6, 8, 10, 12, 14, 16, 18, 20 can each generate transaction requests that have an associated quality of service value (added under software or hardware control) and which are transmitted around the ring-based interconnect 30 to the appropriate one of the request servicing circuits 22, 24. In the case of the shared cache memories 22, 24, the shared cache memories 22, 24 may be memory mapped to different regions of memory address space and accordingly each serve to service transaction requests addressed to the region of memory address space to which they are mapped. The respective POC/POSs 32, 34 can detect memory addresses associated with their shared cache memory 22, 24 and attempt to allocated processing resources to handling the received transaction requests as will be discussed below. Transaction requests which cannot be serviced by the shared cache memories 22, 24, either because they are outside the memory address space ranges concerned or because the memory address is missed within the shared cache memories 22, 24, may be sent to the memory controller 26 to be subject to generation of a further transaction out to the main memory 4. Some transaction requests may map to the input/output device 28 for servicing by this device.

Transaction requests that are issued on to the ring-based interconnect 30 will by default include a dynamic credit (a flag or signal indicating the proposed allocation mode) indicating that the POC/POS 32, 34 should attempt dynamic allocation of processing resources to that transaction request as a first option. If processing resources are not available for that transaction request, then a refusal response is returned to the transaction source concerned via the ring-based interconnect 30 and the transaction source placed into a state where it waits until it receives a proceed request before it resends the transaction request.

The POC/POS 32, 34 will send the proceed request when it has a processing resource available to allocate to that transaction request and will statically allocate (reserve for future use) that processing resource to the transaction source concerned before the proceed response is sent (the transaction source can use the statically allocated processing resource for the same transaction that cause the refusal response or a different pending transaction (e.g. a queued transaction request specifying a higher quality of service). Accordingly, when the transaction source receives the proceed request, this will effectively include a static credit indicating that it may resend its transaction request (or a different transaction request) including that static credit indication back to the POC/POS 32, 34 where a processing resource will already be allocated to that transaction source and which accordingly will be guaranteed to be accepted.

The transaction requests have a quality of service value associated with them. The POC/POSs 32, 34 map using a programmable mapping configuration between such quality of service values and a plurality of priority levels within a hierarchy of priority levels extending from a lowest level to a highest level (in some embodiments the mapping could be static/non-programmable). The POC/POSs 32, 34 are configured to allocate a maximum number of processing resources from the set of processing resources available to them to each priority level. Thus, a low priority level may have a small number of processing resources set as the maximum number which may be concurrently allocated to transaction requests at that priority level whereas a high priority level may have a higher number of processing resources set as the maximum number of processing resources that can be concurrently allocated to that higher priority level. These maximum numbers of processing resources which may be allocated can be fixed or programmable. The maximum number of processing resources monotonically increases as the priority level rises such that the higher priority levels have higher maximum numbers of processing resources that are potentially allocatable to the transaction requests having those priority levels.

When a POC/POS 32, 34 allocates a processing resource for a given priority level, it tracks this using a counter value. The counter is incremented each time a processing resource is allocated for that priority level and decremented each time a processing resource ceases to be allocated to that priority level. In some embodiments the counters for each priority level alone may be incremented and decremented when an allocation is changed as discussed above, but in other embodiments the increments and decrements are applied to the priority level concerned as well as to the counters of all the lower priority levels that are also being tracked. For example, in a system including a high high priority level, a high priority level, a medium priority level and a low priority level in a priority hierarchy, should a processing resource be allocated for the high high priority level, then the counter for the high priority level as well as the counter for the medium priority level and the low priority level will all be incremented. When a processing resource ceases to be allocated to a transaction request from the high priority level, then the counters for the high priority level, the medium priority level and the low priority level will all be decremented. In this way, the selection algorithm may be guided to exhaust the pool of processing resources that can be allocated to lower priority levels before the pool of resources that are allocatable to the higher priority levels are exhausted. It is also possible that these counters may individually track their own priority level without such inter-dependence.

Pending request counters within the POC/POSs 32, 34 are also provides to track the number of transaction requests of each priority level that are waiting to receive a proceed response as well as the identity of the transaction sources and the quality of service values of the refused requests concerned. These pending request counters are uses to track the number and details of the transaction requests awaiting static allocation (i.e. to be allocated a processing resource and sent proceed response (a static credit)).

When a plurality of transaction requests of a given priority level are awaiting allocation of a processing resource, the selection algorithm can select between these transactions using a round robin selection technique in which a pointer is used, and advanced with each selection, with a queue of transaction requests of that priority level awaiting allocation of a processing resource.

The selection algorithm may also select between transaction requests awaiting static allocation that have different priority levels in dependence upon a starvation ratio. It is desirable that a steady stream of transaction request of higher priority level should not completely prevent any transactions from a lower priority level from being allocated processing resources. Accordingly, starvation counters can be used to count how many times a transaction request is selected from a higher priority level in preference over a queued transaction request from a lower priority level. When this count reaches a starvation ratio level (which may be programmable) then a transaction request from the lower priority level is selected in preference to one from the higher priority level such that at least some of the transaction requests from the lower priority level make forward progress.

The transaction sources 6, 8, 10, 12, 14, 16, 18, 20 of FIG. 1 may have the form of processor clusters. Such processor clusters may include a plurality of processor cores and some local cache memory, such as multiple level 1 caches and a shared level 2 cache. The processing resources within the POC/POSs 32, 34 which need to be allocated in accordance with either the dynamic selection or the static selection discussed above are processing slots available for receiving transaction requests from the transaction sources.

Figure 2:
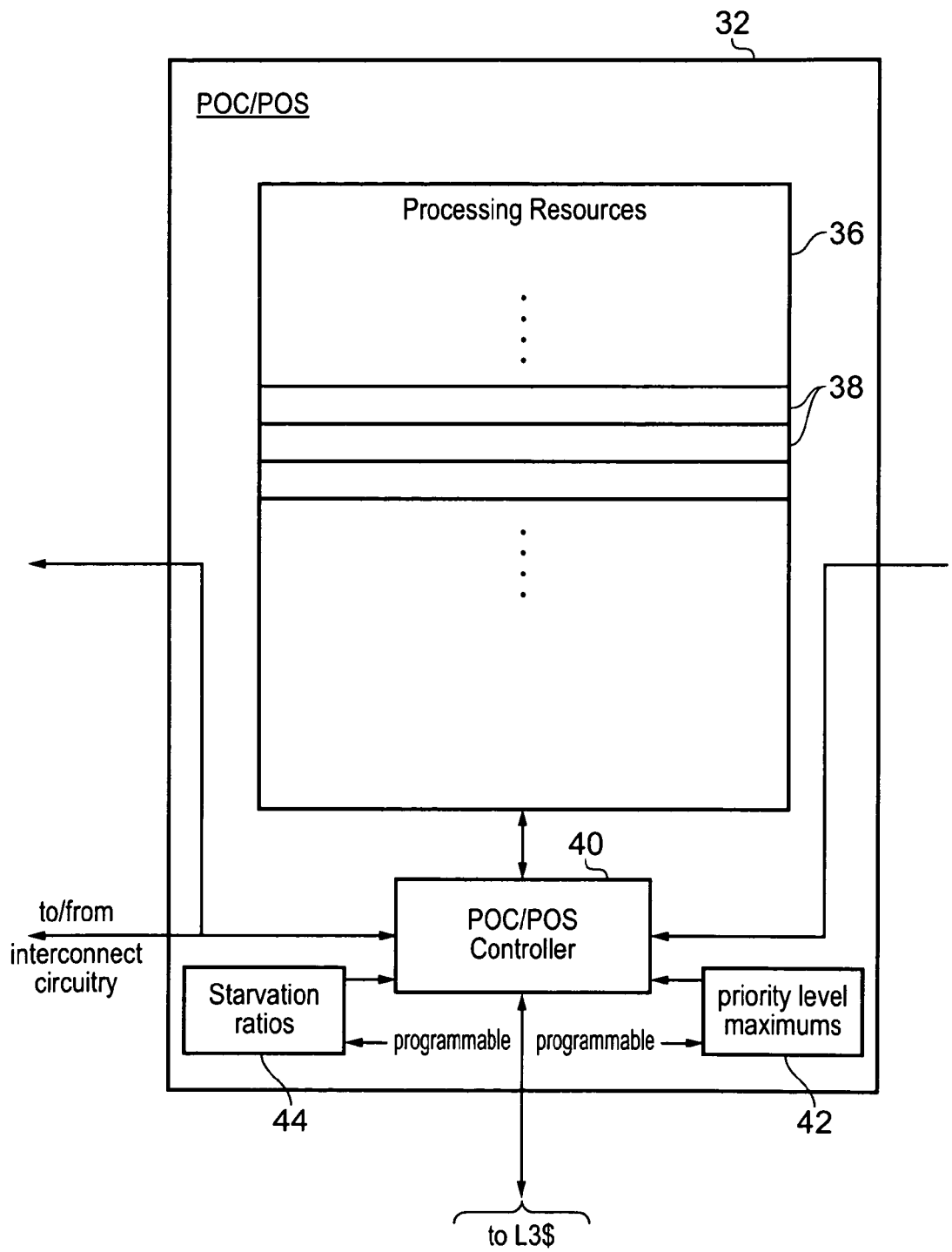
FIG. 2 schematically illustrates in more detail part of the request servicing circuitry of FIG. 1.

FIG. 2 schematically illustrates the POC/POS 32 in more detail. The POC/POS includes a plurality of processing resources 36 comprising multiple processing slots 38 for receiving transactions from the ring-based interconnect 30. A POC/POS controller 40 is responsive to the received transaction requests and tracks the utilisation of the processing resources 36 as well as the number of transaction requests from transaction sources (and their identify and associated quality of service value) that are awaiting allocation of a processing resource 38 of that POC/POS from each of the different priority levels. The POC/POS controller 40 maps from received quality of service values to priority levels in accordance with a programmable mapping. The home controller 40 also receives configuration data 42 specifying the priority level maximum number of allocatable resources 42 as well as the starvation ratios 44 previously discussed. A transaction request is passed from one of the slots 38 to the shared cache 24 by the POC/POS controller 40 for servicing by the shared cache memory 22.

Figure 3:
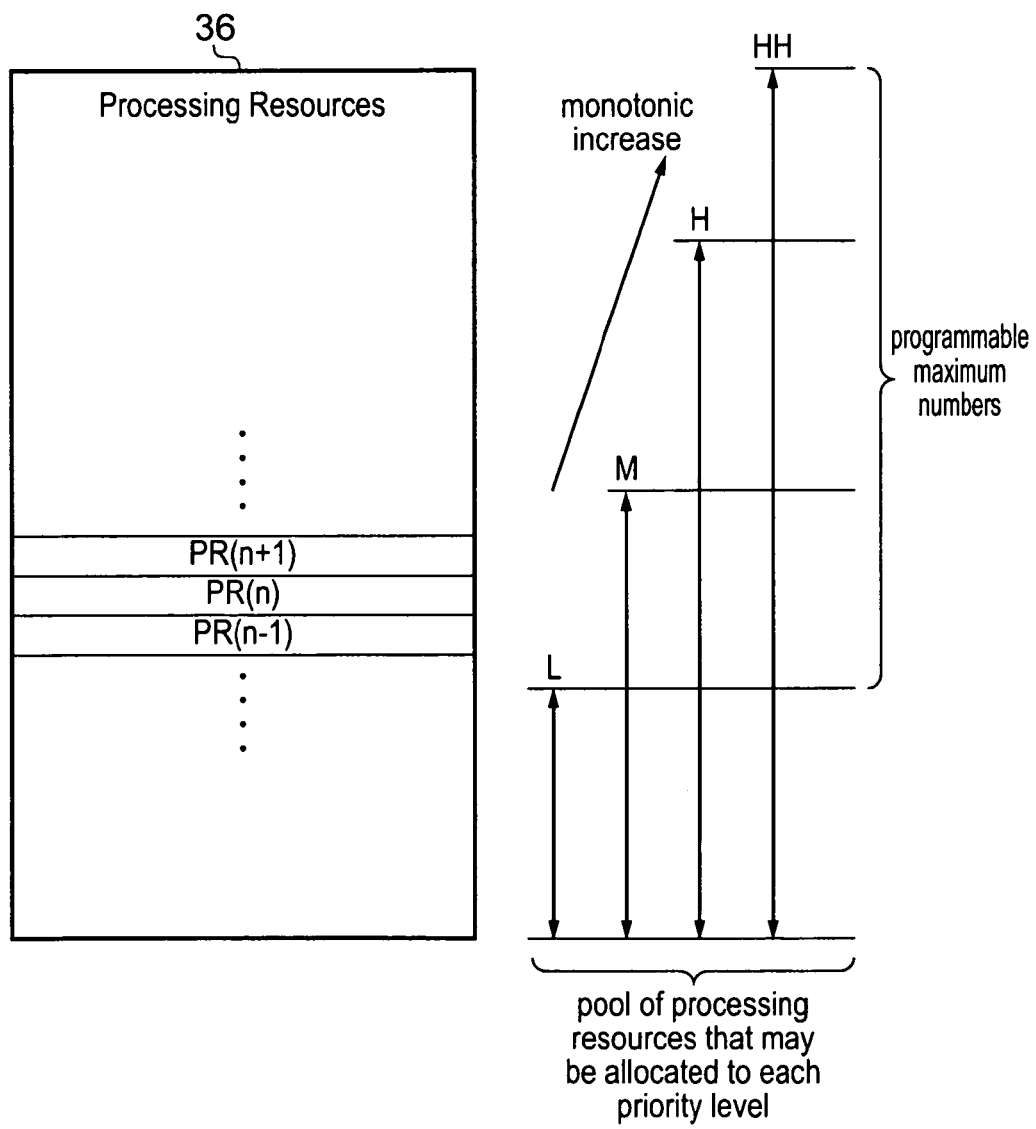
FIG. 3 schematically illustrates a logical view of the allocation of processing resources within request servicing circuitry.

FIG. 3 is a logical view of the processing resources 36 available within the POC/POS 32. In this logical view the processing resources available to each priority level have been grouped together and extend from the lower end to the higher end. The pool of processing resources available to the low priority level L is the least. The pool of processing resources available to the medium priority level M includes all of those available to the lower priority level L as well as some additional resources. A similar relationship holds for the high priority level H and the high high (highest) priority level HH. There is a monotonic increase in the maximum number of processing resources that may be concurrently allocated to each priority level. These maximum numbers may be programmably defined and stored within the priority level maximum numbers 42 illustrated in FIG. 2. It will be appreciated that FIG. 4 is a logical view of the processing resources and the physical processing resources will likely be interleaved between the different priority levels as they are allocated both dynamically and statically when they become available according to either a dynamic allocation (no pre-reservation) or the selection algorithms previously discussed when static allocation is in operation.

Figure 4:
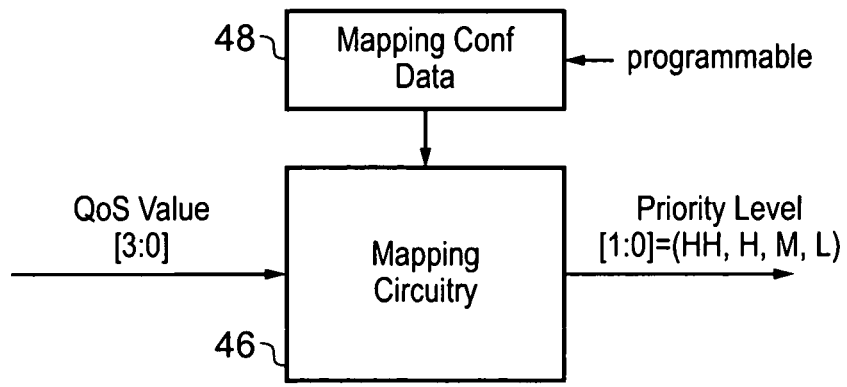
FIG. 4 schematically illustrates circuitry for mapping between quality of service values and priority levels.

FIG. 4 schematically illustrates mapping circuitry 46 within the POC/POS controller 40 which serves to map a quality of service value received with a transaction request into a priority level to be used in controlling the selection algorithm as discussed above. The mapping circuitry 46 is responsive to programmable mapping configuration data 48. The quality of service value may be a four-bit value capable of specifying sixteen different quality of service levels whereas the priority level may be a two-bit value capable of specifying the high high, the high, the medium and the low priority level previously mentioned.

Figure 5:
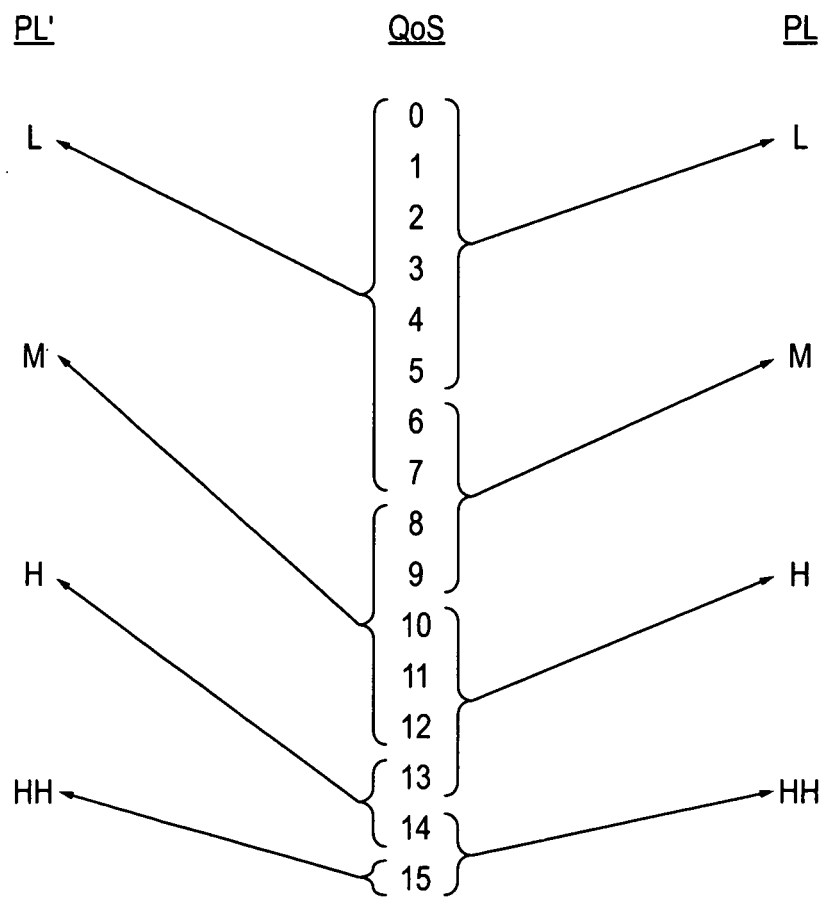
FIG. 5 schematically illustrates the programmability of the mapping between quality of service values and priority levels.

The programmable mapping configuration data can provide different mappings between the quality of service values and the priority values as illustrated in FIG. 5. In the mapping to a first set of priority levels PL, quality of service values 0-5 are mapped to the priority level low, quality of service values 6-9 are mapped to the priority level medium, quality of service values 10-13 are mapped to the priority level high and quality of service values 14-15 are mapped to the priority level high high. In the different mapping illustrated to priority levels PL', the quality of service values 0-8 are mapped to the priority level low, the quality of service values 8-12 are mapped to the priority level medium, the quality of service values 13-14 are mapped to the priority level high and the quality of service value 15 is mapped to the priority level high high.

Figure 6:
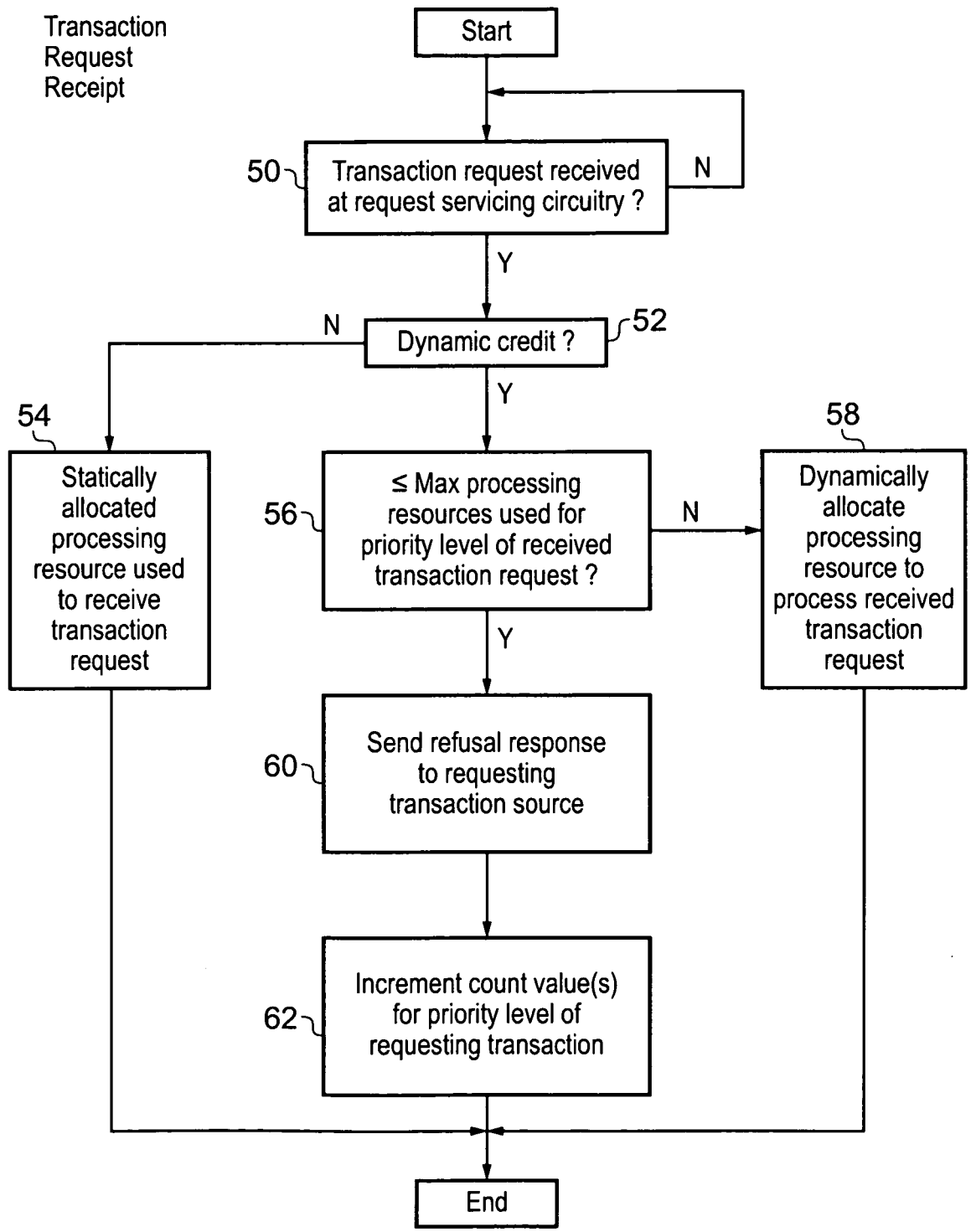
FIG. 6 is a flow diagram schematically illustrating processing performed within transaction request servicing circuitry upon receipt of a transaction request.

FIG. 6 is a flow diagram schematically illustrating transaction requests receipt and processing within the POC/POSs 32, 34. At step 50 processing waits until a transaction request is received. Step 52 determines whether or not the transaction request indicates that it is seeking a dynamic credit, i.e. is seeking dynamic allocation of one of the processing resources. If the transaction request is not seeking a dynamic credit, then it must be seeking a static credit and will have already had its processing resource statically allocated to it as will be discussed further below. Accordingly, processing will in this case proceed to step 54 where the statically allocated processing resource is used to receive the transaction request and the counter(s) tracking allocation of processing resources is incremented.

If the determination at step 52 is that the transaction request is seeking a dynamic credit, then step 56 determines whether the number of processing resources already allocated to the priority level of the transaction request received at step 50 is already equal to or greater than the maximum number of processing resources that may be allocated to that level. If this maximum number has not be exceeded, then step 58 serves to dynamically allocate one of the processing resources to process the received transaction and a response indicating such a dynamic allocation has been successful is returned to the transaction source for the transaction request received at step 50. The counter value(s) tracking the allocation of processing resources are again incremented. These counter value(s) are decremented when a transaction ceases to use an allocated resource and it is released to be allocated to a different transaction.

If the determination at step 56 is that the transaction request that has been received requesting a dynamic credit cannot be dynamically allocated a processing resource since the maximum number permitted for that priority level has been exceeded, then processing proceeds to step 60 where a refusal response is returned to the requesting transaction source. Step 62 then increments the count value for the priority level concerned to indicate that one more transaction request is awaiting allocation of a processing resource for that priority level.

Figure 7:
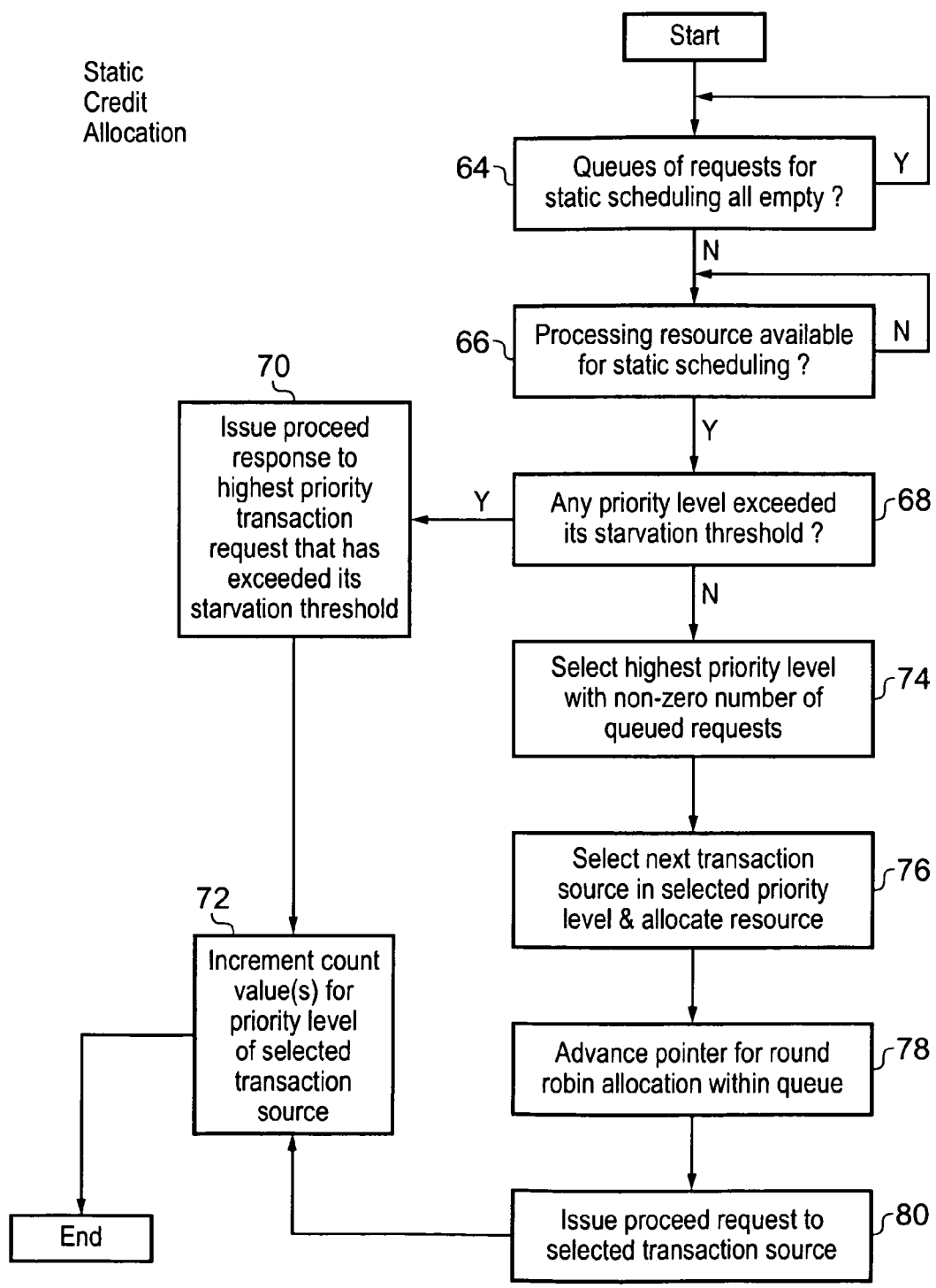
FIG. 7 is a flow diagram schematically illustrating static credit allocation.

FIG. 7 is a flow diagram schematically illustrating static credit allocation within the POC/POS 32. Step 64 determines from the pending transaction counter values whether or not there are any transaction requests awaiting static allocation of a processing resource. If there are such transaction requests awaiting processing resource allocation, then processing proceeds to step 66 where the system waits until a processing resource becomes available for static scheduling. Such a processing resource may become available when a previously dynamically or statically allocated processing resource is released as it is no longer being used by a transaction request because that transaction request has completed.

When a processing resource becomes available for static scheduling at step 66, processing proceeds to step 68 where a determination is made as to whether or not any priority level has exceeded its starvation threshold. Such a starvation threshold indicates that a given priority level has not been allocated a processing resource because of a higher priority level for greater than a predetermined number of such allocations. These starvation levels may be individually programmed as ratios to have effect between individual pairs of priority levels. Thus, there may be a starvation ratio for the low priority level in respect of the medium priority level and separately in respect of each of the high and high high priority levels. The starvation ratios only act up the priority hierarchy as a higher priority level will not be starved of processing resource allocation because of a lower priority level. If the determination at step 68 is that a priority level is currently exceeding its starvation threshold, then step 70 serves to issue a proceed response to the highest priority transaction request that has exceeded its starvation threshold (using a round robin selection if there are more than one of such transactions). Step 72 then increments the count value for the priority level or levels concerned so as to track the number of processing resources allocated to that priority level. If more than one counter is incremented, this step also increments the counters of the lower priority levels.

If the determination at step 68 is that a starvation threshold has not been exceeded, then step 74 selects the highest priority level with a non-zero number of queued requests. Step 76 then selects the next transaction in the selected priority level pointed to by the pointer within that queue of transaction requests. Step 78 then advances the pointer for round robin allocation within the queue and step 80 issues a proceed request to the transaction source of the selected transaction request to indicate that the transaction source should resend its transaction request this time indicating the static credit. Processing then proceeds to step 72.

Figure 8:
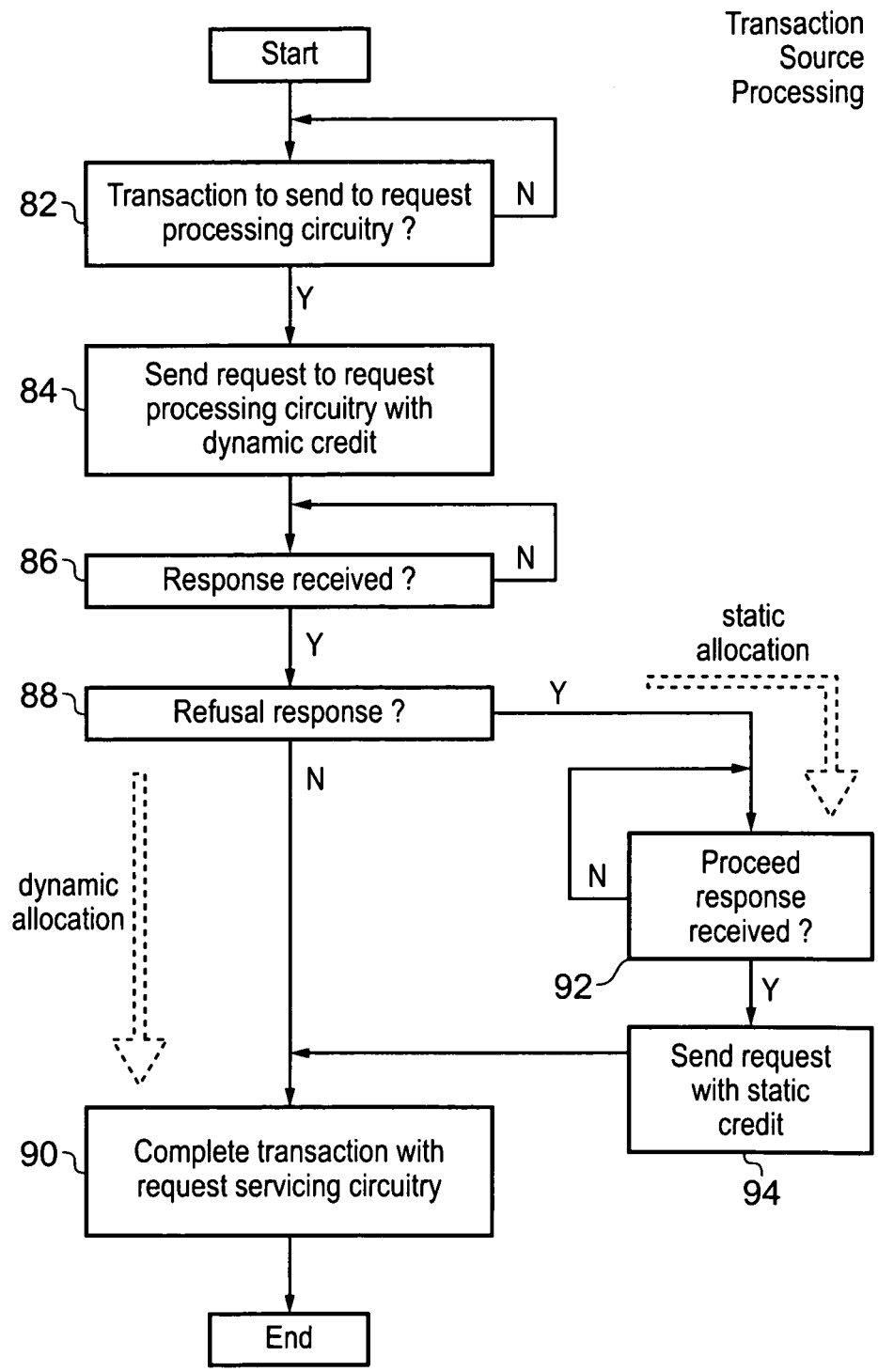
FIG. 8 is a flow diagram schematically illustrating processing at a transaction source.

FIG. 8 schematically illustrates processing performed within the transaction sources 6, 8, 10, 12, 14, 16, 18, 20. At step 82 processing waits until there is a transaction request ready to be sent. Step 84 sends the transaction request to the request servicing circuitry with a dynamic credit indicating that default dynamic allocation of a processing resource is requested. Step 86 then waits for a response. When a response is received, step 88 determines whether this is a refusal response. If the response is not a refusal response, then a dynamic allocation has been successful and processing proceeds to step 90 where the transaction is completed in cooperation with the request servicing circuitry.

If a refusal response was received at step 88, then processing proceeds to step 92 where the transaction source waits until a proceed response is received. Such a proceed response indicates that a static allocation of a processing resource has now been made for the transaction request and thus processing should proceed to step 94 where the transaction request is resent, but this time indicating that it has an associated static credit and that a processing resource has already been allocated to that transaction source in accordance with the static allocation techniques previously described. The statically allocated transaction is then completed at step 90.

FIG. 9 schematically illustrates the programmable starvation ratios which may be used to avoid lower priority level transaction levels being completely started of allocation of processing resources by higher priority level transactions. In particular, a starvation ratio is programmed for each relationship between a priority level and the higher priority levels within the hierarchy of levels. This number indicates the maximum consecutive number of transactions from that higher priority level which should be selected for allocation in turn before a transaction from the lower priority level is selected for allocation. Thus, if the starvation ratio was thirty, then this would indicate that for every thirty consecutive transactions of the higher priority level selected for allocation a single lower priority transaction should be forced to be selected.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
   a plurality of transaction sources configured to generate transaction requests; and
   request servicing circuitry configured to process said transaction requests using a set of processing resources; wherein
   said transaction requests each have an associated quality of service value within a range of quality of service values;
   said request servicing circuitry is configured to map, in accordance with a quality of service mapping configuration, quality of service values within different subranges of said range of quality of service values to different priority levels within a hierarchy of priority levels extending from a lowest level to a highest level; and
   said request servicing circuitry is configured to provide a maximum number of said processing resources that can be concurrently allocated to service transaction requests within each level of said hierarchy, wherein
   said request servicing circuitry is configured to:
      to receive from a requesting transaction source from among said plurality of transaction sources an at least implicit request to allocate one of said set of processing resources for use by said requesting transaction source in processing a transaction associated with said transaction request;
      to determine if one of said set of processing resources is available for use by said requesting transaction source;
      if one of said set of processing resources is available for use by said requesting transaction source, then to allocate said one or said set of processing resources to said requesting transaction source for use in processing said transaction; and
      if none of said set of processing resources is available for use by said requesting transaction source, then to send a retry response to said requesting transaction source;
   said requesting transaction source is configured;
      to receive from said request servicing circuitry said retry response; and
      to respond to said retry response by waiting for a proceed response to be received from said request servicing circuitry before proceeding with said transaction associated with said transaction request; and
   said request servicing circuitry is configured:
      to track those of said plurality of transaction sources awaiting a proceed response;
      to allocate one of said set of processing resources to one of said transaction sources awaiting a proceed response; and
      to send a proceed response to said one of said transaction sources awaiting a proceed response.

2. An integrated circuit as claimed in claim 1, wherein said quality of service mapping configuration is programmable for at least some of said quality of service values.

3. An integrated circuit as claimed in claim 1, wherein said maximum number within each level of said hierarchy is a programmable parameter for at least some levels of said hierarchy.

4. An integrated circuit as claimed in claim 1, wherein said maximum number increases monotonically within said hierarchy of priority.

5. An integrated circuit as claimed in claim 1, wherein when one of said processing resources is allocated to a transaction request within a given level of said hierarchy, then a number of resources tracked by said request servicing circuitry as allocated to said given level and any lower levels within said hierarchy is incremented.

6. An integrated circuit as claimed in claim 1, wherein when one of said processing resources ceases to be allocated to a transaction request within a given level of said hierarchy, then a number of resources tracked by said request servicing circuitry as allocated to said given level and any lower levels within said hierarchy is decremented.

7. An integrated circuit as claimed in claim 1, wherein when one of said processing resources is allocated to a transaction request within a given level of said hierarchy, then a number of resources tracked by said request servicing circuitry as allocated to said given level within said hierarchy is alone incremented.

8. An integrated circuit as claimed in claim 1, wherein when one of said processing resources ceases to be allocated to a transaction request within a given level of said hierarchy, then a number of resources tracked by said request servicing circuitry as allocated to said given level within said hierarchy is alone decremented.

9. An integrated circuit as claimed in claim 1, wherein said request servicing circuitry is configured to switch between dynamic allocation of said processing resources among said transaction requests and static allocation of said processing resources among said transaction request using a selection algorithm.

10. An integrated circuit as claimed in claim 9, wherein said selection algorithm is dependent upon a respective priority level associated with each of said plurality of transaction requests.

11. An integrated circuit as claimed in claim 9, wherein said selection algorithm uses a round robin selection among transaction requests awaiting a static allocation that share a priority level.

12. An integrated circuit as claimed in claim 9, wherein said selection algorithm selects between said transaction requests awaiting static allocation that have different priority levels.

13. An integrated circuit as claimed in claim 12, wherein said selection between said transaction requests awaiting static allocation that have different priority levels is dependence upon a starvation ratio.

14. An integrated circuit as claimed in claim 13, wherein said starvation ratio is programmable.

15. An integrated circuitry as claimed in claim 1, wherein said plurality of transaction sources comprises a plurality of processor clusters each comprising a plurality of processor cores.

16. An integrated circuit as claimed in claim 1, wherein said request servicing circuitry comprises a shared cache memory.

17. An integrated circuit as claimed in claim 1, comprising a plurality of said request servicing circuitry each having a set of processing resources for allocation among said plurality of transaction requests.

18. An integrated circuit as claimed in claim 1, wherein said set of processing resources comprises a set of processing slots available to receive said transaction request.

19. An integrated circuit as claimed in claim 1, further comprising interconnect circuitry configured to communicate said transaction requests between said transaction sources and said request servicing circuitry.

20. An integrated circuit as claimed in claim 19, wherein said interconnect circuitry is ring-based interconnect circuitry.

21. An integrated circuit comprising:
a plurality of transaction source means for generating transaction requests; and
request servicing means for processing said transaction requests using a set of processing resource means for processing; wherein
said transaction requests each have an associated quality of service value within a range of quality of service values;
said request servicing means is configured to map, in accordance with a programmable quality of service mapping configuration, quality of service values within different sub-ranges of said range of quality of service values to different priority levels within a hierarchy of priority levels extending from a lowest level to a highest level; and
said request servicing means is configured to provide a maximum number of said processing resource means that can be concurrently allocated to service transaction requests within each level of said hierarchy, wherein
said request servicing means is configured to:
  to receive from a requesting transaction source means from among said plurality of transaction source means an at least implicit request to allocate one of said set of processing resource means for use by said requesting transaction source means in processing a transaction associated with said transaction request;
  to determine if one of said set of processing resource means is available for use by said requesting transaction source means;
  if one of said set of processing resource means is available for use by said requesting transaction source means, then to allocate said one or said set of processing resource means to said requesting transaction source means for use in processing said transaction; and
  if none of said set of processing resource means is available for use said requesting transaction source means, then to send a retry response to said requesting transaction source means;
said requesting transaction source means is configured:
  to receive from said request servicing means said retry response; and
  to respond to said retry response by waiting for a proceed response to be received from said request servicing means before proceeding with said transaction associated with said transaction request; and
said request servicing means is configured:
  to track those of said plurality of transaction source means awaiting a proceed response;
  to allocate one of said set of processing resource means to one of said transaction source means awaiting a proceed response; and
  to send a proceed response to said one of said n source means awaiting a proceed response.

22. A method of communicating within an integrated circuit comprising the steps of:
generating transaction requests using a plurality of transaction sources; and
processing said transaction requests using a set of processing resources; wherein
said transaction requests each have an associated quality of service value within a range of quality of service values; and further comprising the steps of
mapping, in accordance with a programmable quality of service mapping configuration, quality of service values within different sub-ranges of said range of quality of service values to different priority levels within a hierarchy of priority levels extending from a lowest level to a highest level; and
providing a maximum number of said processing resource means that can be concurrently allocated to service transaction requests within each level of said hierarchy,
said request servicing circuitry performs the steps of:
  receiving from a requesting transaction source from among said plurality of transaction sources an at least implicit request to allocate one of said set of processing resources for use by said requesting transaction source in processing a transaction associated with said transaction request;
  determining if one of said set of processing resources is available for use by said requesting transaction source;
  if one of said set of processing resources is available for use by said requesting transaction source then allocating said one or said set of processing resources to said requesting transaction source for use in processing said transaction; and
  if none of said set of processing resources is available for use by said requesting transaction source, then sending a retry response to said requesting transaction source;
said requesting transaction source performs the steps of:
  receiving from said request servicing circuitry said retry response; and
  responding to said retry response by waiting for a proceed response to be received from said request servicing circuitry before proceeding with said transaction associated with said transaction request; and
said request servicing circuitry performs the steps of:
  tracking those of said plurality of transaction sources awaiting a proceed response;
  allocating one of said set of processing resources to one of said transaction sources awaiting a proceed response; and
  sending a proceed response to said one of said transaction sources awaiting a proceed response.

* * * * *